3,514,490
PROCESS FOR THE PRODUCTION OF DIPHENOLS
André Marlard, Lyon, France, assignor to Rhone-Poulenc S.A., Paris, France, a French body corporate
No Drawing. Filed Mar. 10, 1967, Ser. No. 622,110
Claims priority, application France, Mar. 15, 1966, 53,505, Patent 1,479,354
Int. Cl. C07c 39/08
U.S. Cl. 260—621                         3 Claims

ABSTRACT OF THE DISCLOSURE

Pyrocatechol and hydroquinone are produced by oxidizing phenol with a saturated aliphatic peracid of 1 to 4 carbon atoms, the oxidation being preferably terminated when not more than 30 of the phenol has been oxidized.

---

The present invention relates to the production of hydroquinone and pyrocatechol.

Hydroquinone and pyrocatechol are used in large quantities in the plastics field and in photography. Hydroquinone is industrially prepared by reducing p-benzoquinone, which is itself prepared by oxidation of aniline with manganese dioxide in aqueous sulphuric acid. Pyrocatechol is prepared by alkaline fusion of o-chlorophenol or 2,4-phenoldisulphonic acid. In both cases, the introduction of a second phenolic group on the benzene nucleus necessitates passing through intermediate products, and therefore the application of various stages.

Many attempts have been made to introduce a hydroxyl group onto a benzene ring and more particularly onto the benzene nucleus of phenol. Thus, Chwala et coll. (J. Prakt. Chem., 152, 46 (1939)) have oxidised phenol with aqueous hydrogen peroxide in the presence of ferrous sulphate to form a mixture of hydroquinone and pyrocatechol in a yield of 72%. In order to obtain this yield, it is necessary to operate in very dilute aqueous medium, which results in difficulties in the recovery of the diphenols, and to employ very long residence times (24 hours). It has moreover been pointed out that this reaction must be carried out under relatively gentle conditions in order to avoid a violent reaction leading in particular to the formation of benzoquinone (cf. Stein, J. Chem. Soc., 1951, 3266).

It has now been found that it is possible to prepare hydroquinone and pyrocatechol directly and in good yields by the simple oxidation of phenol, using for this oxidation a saturated aliphatic peracid of from one to four carbon atoms. It has also been found that the best results are obtained by limiting the reaction so that not more than 30% of the phenol in the reaction mixture is oxidized as, when the extent of conversion exceeds 30%, the yield very rapidly decreases. This can conveniently be done by limiting the amount of peracid used (or produced in situ, as described below) to not more than 0.3 mol, e.g. 0.01 to 0.3 mol, per mol of phenol. It is also advantageous to operate in the presence of phosphoric acid. By this procedure, diphenol yields of 60% to 80% based on the unrecovered phenol are obtainable with short contact times.

The peracid employed in the new process, which is preferably performic acid or peracetic acid, may be prepared by employing any method of preparing peracids. Preferably, the peracid is formed in situ in contact with the phenol to be converted.

In a preferred method of carrying out the new process, hydrogen peroxide is reacted with a solution of a saturated aliphatic acid having at most 4 carbon atoms in phenol, the said solution being brought to an appropriate temperature, or a solution of the saturated aliphatic acid and hydrogen peroxide is gradually introduced into phenol, brought to appropriate temperature, or into a solution of phenol in a saturated aliphatic acid. The proportion of saturated aliphatic acid should remain between 1% and 30% by weight based on the phenol. The aliphatic acid may be employed in the pure state or in diluted form; its concentration and the concentration of the hydrogen peroxide in the reaction medium as a whole are not critical.

As already stated, phosphoric acid may be added to the reaction mixture. The quantity of phosphoric acid employed may vary within fairly wide limits, but it is unnecessary for it to exceed 5% by weight based on the phenol, and proportions less than 0.01% are generally ineffective. A proportion of 2% is generally quite suitable. When phosphoric acid is employed as catalyst, it may be eliminated from the reaction mixture by passing it over an anion exchange resin.

The temperature of the reaction may be from 50° C. to 150° C. and is preferably 80° C. to 100° C. under normal pressure. It is also possible to operate under pressure but there is no advantage in this.

The diphenols obtained may be separated from the phenol, and the hydroquinone from the pyrocatechol, by fractional distillation. The pyrocathechol may also be separated from the hydroquinone by precipitation of the former as its lead salt, the pyrocatechol being subsequently regenerated after separation, by the action of an acid.

The recovered unconverted phenol may be employed in a second oxidation.

The operating conditions and the reactants employed are very suitable for continuous operation of the process.

The invention is illustrated by the following examples.

EXAMPLE 1

Into a four-necked, one-litre, round-bottomed flask provided with a stirrer, a reflux condenser, a dropping funnel, an extraction tube and a thermostatically controlled heating device phenol (235 g., 2.5 mol), formic acid (12 g.), and phosphoric acid ($d=1.71$, 1 g.) are introduced. Stirring is started and the contents of the flask are brought to 80° C. A mixture consisting of 17.4 g. of aqueous hydrogen peroxide solution having a concentration of 39% (weight/weight, i.e. 0.2 mol) and 20 g. of formic acid is then added in 20 minutes. The temperature is maintained at 80° C. with stirring. The hydrogen peroxide in the reaction mixture is periodically titrated and the results of these titrations are set out in the following table.

| Time after the end of the addition: | Hydrogen peroxide content in percent |
|---|---|
| 2 min. | 1.33 |
| 30 min. | 0.49 |
| 1 hr. | 0.22 |
| 1 hr., 40 min. | 0.08 |
| 2 hr. | 0.06 |
| 3 hr. | 0.04 |

(The samples taken weighed 30 g. in all.)

After 3 hours at 80° C., the water and the formic acid are eliminated by distillation under reduced pressure (50 mm. Hg), and the residue is then passed over the anion exchange resin sold under the registered trademark "Amberlite IR–45." The resin is washed with diethyl ether to recover the retained phenols. By distillation of the ether with which the resin has been washed, a residue is obtained which is combined with the distillation residue passed over the resin, and the whole is then distilled to separate the unconverted phenol. Water is added to the residue of this last distillation and the pyrocatechol is separated from the hydroquinone by precipitation as its lead salt.

After filtration of the latter, the pyrocatechol is regenerated by treatment of the precipitate with 30% sulphuric acid, followed by extraction with diethyl ether and distillation. In this way, 9.62 g. of pyrocatechol are obtained.

The hydroquinone is recovered by extraction with diethyl ether of the aqueous phase resulting after the precipitation and removed of the lead salt of the pyrocatechol, followed by distillation of the ethereal extract. 6.54 g. of hydroquinone are isolated.

In all, 214.5 g. of phenol were recovered. Therefore, 20.5 g. of phenol had disappeared (8.7% conversion), and the total yield of diphenol is 79% based on the converted phenol.

EXAMPLE 2

The procedure of Example 1 is followed, without the phosphoric acid. The diphenol yield based on the converted phenol is 63% (25% for the pyrocatechol and 38% for the hydroquinone).

EXAMPLE 3

The procedure of Example 1 is followed, using acetic acid instead of formic acid. The initial charge in the flask consists of phenol (235 g.), acetic acid (12 g.), and phosphoric acid (2 g.). The oxidising mixture consists of: hydrogen peroxide (17.4 g.) and acetic acid (26 g.). The yields are 25.7% and 28.7% respectively of pyrocatechol and hydroquinone (a total yield of 54.4%).

I claim:
1. Process for the oxidation of phenol to hydroquinone and pyrocatechol which comprises contacting phenol with performic acid at from 50° to 150° C., the conversion of phenol being limited to not more than 30%.
2. Process according to claim 1, in which the oxidation is carried out in the presence of 0.01% to 5% by weight of phosphoric acid based on the weight of the phenol.
3. A process for the oxidation of phenol to hydroquinone and pyrocatechol which comprises contacting phenol with performic acid at from 50° to 150° C., using 0.01 to 0.3 mol of performic acid per mol of phenol and carrying out the oxidation in the presence of 0.01% to 5% of phosphoric acid based on the weight of the phenol.

References Cited

UNITED STATES PATENTS 3,376,351   4/1968   Amedjian _____ 260—621

OTHER REFERENCES

Henderson et al.: Jour. Chem. Soc., 97, 1659–69 (1910).

LEON ZITVER, Primary Examiner